(12) United States Patent
Schillen et al.

(10) Patent No.: US 7,636,610 B2
(45) Date of Patent: Dec. 22, 2009

(54) METHOD AND DEVICE FOR PRODUCING A THREE-DIMENSIONAL OBJECT, AND COMPUTER AND DATA CARRIER USEFUL THEREFOR

(75) Inventors: Volker Schillen, Dusseldorf (DE); Hendrik John, Hunxe (DE); Ali Siblani, Dearborn, MI (US)

(73) Assignee: Envisiontec GmbH, Gladbeck (DE)

( * ) Notice: Subject to any disclaimer, the term of this patent is extended or adjusted under 35 U.S.C. 154(b) by 268 days.

(21) Appl. No.: 11/488,947

(22) Filed: Jul. 19, 2006

(65) Prior Publication Data

US 2008/0021586 A1    Jan. 24, 2008

(51) Int. Cl.
    *G06F 19/00* (2006.01)
(52) U.S. Cl. .............. 700/119; 700/118; 700/124; 264/401
(58) Field of Classification Search .......... 264/401; 700/118, 119, 124
    See application file for complete search history.

(56) References Cited

U.S. PATENT DOCUMENTS

| | | | | |
|---|---|---|---|---|
| 5,139,338 | A * | 8/1992 | Pomerantz et al. | 356/601 |
| 5,157,423 | A * | 10/1992 | Zur | 347/120 |
| 5,171,490 | A * | 12/1992 | Fudim | 264/401 |
| 5,247,180 | A | 9/1993 | Mitcham et al. | |
| 5,289,214 | A * | 2/1994 | Zur | 347/120 |
| 5,454,069 | A | 9/1995 | Knapp et al. | |
| 5,945,058 | A * | 8/1999 | Manners et al. | 264/401 |
| 5,980,813 | A | 11/1999 | Narang et al. | |
| 6,051,179 | A * | 4/2000 | Hagenau | 264/401 |
| 6,153,034 | A * | 11/2000 | Lipsker | 156/73.1 |
| 6,281,903 | B1 * | 8/2001 | Martin et al. | 345/421 |
| 7,073,883 | B2 * | 7/2006 | Billow | 347/19 |
| 7,133,041 | B2 * | 11/2006 | Kaufman et al. | 345/419 |
| 7,215,430 | B2 * | 5/2007 | Kacyra et al. | 356/601 |
| 7,261,542 | B2 * | 8/2007 | Hickerson et al. | 425/174.4 |
| 2003/0067539 | A1 * | 4/2003 | Doerfel et al. | 348/51 |
| 2005/0248062 | A1 | 11/2005 | Shkolnik et al. | |
| 2007/0120842 | A1 * | 5/2007 | Hess | 345/419 |

FOREIGN PATENT DOCUMENTS

| | | |
|---|---|---|
| DE | 93 19 405.6 | 5/1994 |
| DE | 93 19 405.6 U | 5/1994 |
| DE | 299 11 122 | 11/1999 |
| EP | 1 250 995 A1 | 10/2002 |
| EP | 1 338 846 A12 | 8/2003 |
| WO | WO-01/00390 A1 | 1/2001 |
| WO | WO-2005/110722 | 11/2005 |

* cited by examiner

*Primary Examiner*—Michael D Masinick
(74) *Attorney, Agent, or Firm*—Hansen IP Law PLLC

(57) ABSTRACT

The invention relates to a method for producing a three-dimensional object by solidification of a material solidifiable under the action of electromagnetic radiation by means of energy input via an imaging unit comprising a predetermined number of discrete imaging elements (pixels). The method comprises performing solidification with exposure using bitmap mask. The bitmap mask may be formed from a stack of bitmap data provided by an overlap analysis of a three-dimensional volume completely or partially enclosing a three-dimensional model of at least a part of the three-dimensional object to be produced. Alternatively, bitmap mask may be formed from a two-dimensional data set comprising overlap information. Solidification may be performing with exposure using bitmap mask generated "on the fly". The invention is also directed to devices, and a computer and a data carrier useful for performing or executing the method.

31 Claims, 9 Drawing Sheets

3D data (STL)

Layered bitmap data

Fig. 1

3D data (STL)    Layered 2D data

Fig. 2

3D data (STL)    Layered bitmap data

Color coded size of
intersection area between
a Voxel and 3D part

Build Volume rasterised
into a Voxel Cube

Color coded size of intersection area
between every Voxel and 3D part

Fig. 7 C

Color coded size of intersection area
between every Voxel and 3D part

Conversion of
Voxel intersection areas
into Pixel intensity values
(Gray values)

Build Volume rasterised
into a stack of bitmaps

METHOD AND DEVICE FOR PRODUCING A THREE-DIMENSIONAL OBJECT, AND COMPUTER AND DATA CARRIER USEFUL THEREFOR

TECHNICAL FIELD

The present invention relates to a method and a device for producing a three-dimensional object by solidification of a material solidifyable under the action of electromagnetic radiation by means of energy input via an imaging unit comprising a predetermined number of discrete imaging elements (pixels). The present invention particularly relates to devices and methods in which a three-dimensional object is generated based on an exposure by means of a raster (bitmap) mask. Typically, the smallest physical resolution in the mask is given by the size of a pixel. A particular technique which may be applied to the imaging unit of the device is the Spatial Light Modulator (SLM) technology.

BACKGROUND ART

In the conventional field of stereolithography and rapid prototyping apparatus, three-dimensional objects are build by layer-wise solidification of a material solidifyable under the action of electromagnetic radiation, commonly by photo-hardening of a photopolymer. There are methods and devices for the layered-wise construction of three-dimensional objects by exposure through an imaging unit comprising a predetermined number of discrete elements (pixels). Reference can be made, for example, to U.S. Pat. No. 5,247,180, U.S. Pat. No. 5,980,813, DE 93 19 405.5 U, DE 299 11 122 U, EP 1 250 995 A, EP 1 338 846 A, WO 01/00390, and WO 2005/110722.

With laser-based systems for photo-polymerisation, the energy or light output in the exposure point is provided by energy setting of the laser beam. To selectively harden a corresponding layer, the laser beam is scanned over the cross-sectional surface to be correspondingly hardened. The contours of the cross-sectional surface to be hardened can be scanned by the laser beam as a curve.

Figure 1:
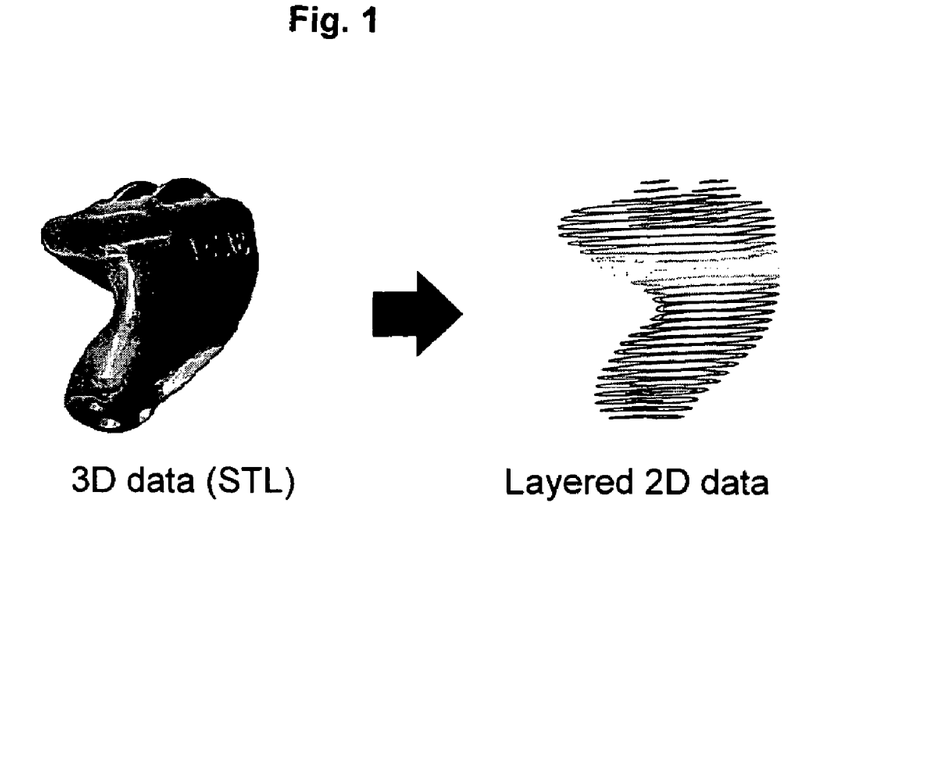
FIG. 1 schematically and illustratively shows a scheme demonstrating conventional transformation from three-dimensional object data into sliced, two-dimensional (cross-sectional) data in a prior art method for producing a three-dimensional object.

The layer-wise building of the three-dimensional object occurs by solidification in a cross-sectional area corresponding to a cross-section of a three-dimensional (3D) model corresponding to the three-dimensional object. Thus, the cross-sectional area to be hardened lies in the XY building plane and respective layers are hardened to a desired layer thickness in the Z dimension (Z direction). For execution of this building method, a process includes a step of slicing 3D model data (STL) into a group of sliced two-dimensional (2D) data to correspond to the cross-sectional area to be exposed. This prior art is illustrated schematically in FIG. 1.

The afore-mentioned prior art transformation of 3D model data to sliced, layered 2D data corresponding to respective cross-sectional areas, however, is complex and involve extensive algorithms and computer processing. Furthermore, accuracy of a layer-wise hardening of a photo-polymer depends on numerous factors, such as apportionment of the sliced cross-sections according to Z heights, setting of the contour lines of the sliced cross-sectional areas and a corresponding adjustment of an energy (light output) source and respective control elements, etc.

OBJECT OF THE INVENTION

It is an object of the invention to improve method and device for the production of a three-dimensional object by providing a less complex system, involving relatively easy transformation of object information into appropriate building information. It is furthermore desirable to make a relatively accurate building feasible at surface structures of the three-dimensional object to be produced.

SUMMARY OF THE INVENTION

According to a first aspect of the invention, there is provided a method for producing a three-dimensional object by solidification of a material solidifiable under the action of electromagnetic radiation by means of energy input via an imaging unit comprising a predetermined number of discrete imaging elements (pixels), comprising the steps of:

a) providing a stack of bitmap data from a three-dimensional volume completely or partially enclosing a three-dimensional model of at least a part of the three-dimensional object to be produced, wherein the stack of bitmap data had been generated by a process including:

superimposing a grid raster over the three-dimensional volume completely or partially enclosing the three-dimensional model, determining whether there is an overlap with the three-dimensional model or not, setting bitmap data to an energy output status where an overlap has been determined, or setting bitmap data to a status of no energy output where no overlap has been determined; and b) performing solidification with exposure using bitmap mask formed from the stack of bitmap data provided in step a).

This first aspect of the invention is particularly suitable when the aforementioned bitmap stack has already been provided.

According to a second aspect of the invention, there is provided a method for producing a three-dimensional object by solidification of a material solidifiable under the action of electromagnetic radiation by means of energy input via an imaging unit comprising a predetermined number of discrete imaging elements (pixels), comprising the steps of:

a) providing a two-dimensional data set from a three-dimensional volume completely or partially enclosing a three-dimensional model of at least a part of the three-dimensional object to be produced, wherein the two-dimensional data set had been generated by a process including:

superimposing a grid raster over the three-dimensional volume completely or partially enclosing the three-dimensional model, determining whether there is an overlap with a three-dimensional model or not, transforming overlap information into transition information of different types including entry information as a first type, defined by transition from the outside to the inside of a three-dimensional model, and exit information as a second type, defined by transition from the inside to the outside of a three-dimensional model, saving the transition information in a two-dimensional data set; and b) performing solidification with exposure using bitmap mask generated using the two-dimensional data set provided in step a).

This second aspect of the invention is particularly suitable when a bitmap mask for solidification is generated by the aforementioned two-dimensional data set. It is possible to subsequently generate a bitmap stack from the two-dimensional data set. Preferably, at least one bitmap is generated directly from the two-dimensional data set during the building process. Thus, it is feasible to control bitmap masks of an imaging unit of a device for producing a three-dimensional object on the fly.

According to another aspect of the invention, there is provided a device for producing a three-dimensional object by solidification of a material solidifiable under the action of electromagnetic radiation by means of energy input via an imaging unit comprising a predetermined number of discrete imaging elements (pixels), wherein the device comprises a computer unit, an IC and/or a software implementation, respectively arranged to execute a stack of bitmap data transformed from a three-dimensional volume which includes at least a part of a three-dimensional model of the object to be produced, wherein each bitmap data of the stack comprises information on an energy output level such that pixels corresponding to a location within the three-dimensional model are set to an energy output status, and pixels corresponding to a location outside the three-dimensional model are set to a status of no energy output.

According to a further aspect of the present invention, there is provided a device for producing a three-dimensional object by solidification of a material solidifiable under the action of electromagnetic radiation by means of energy input via an imaging unit comprising a predetermined number of discrete imaging elements (pixels), wherein the device comprises a computer unit, an IC and/or a software implementation, respectively arranged to execute bitmap data transformed from a two-dimensional data set of transition information, wherein said transition information include entry information as a first type, defined by transition from the outside to the inside of a three-dimensional model, and exit information as a second type, defined by transition from the inside to the outside of a three-dimensional model, said model corresponding to at least a part of the three-dimensional object to be produced.

According to still another aspect of the present invention, there is provided computer or a data carrier storing a bitmap data stack, wherein each bitmap data of the bitmap stack comprise information on energy output level for controlling an imaging unit which comprises a predetermined number of discrete imaging elements (pixels) corresponding to a rasterisation of a bitmap.

According to a still further aspect of the present invention, there is provided computer or a data carrier a two-dimensional data set comprising transition information which include entry information as a first type, defined by transition from the outside to the inside of a three-dimensional model, and exit information as a second type, defined by transition from the inside to the outside of a three-dimensional model, said model corresponding to at least a part of a three-dimensional object to be produced on the basis of the stored two-dimensional data set.

The computer or data carrier store a bitmap data stack or a two-dimensional data set which respectively are particularly suitable for executing a method according to the present invention in the first or second aspect mentioned above, or for executing a device according to the present invention mentioned above.

DESCRIPTION OF PRINCIPLES, FEATURES AND ADVANTAGES, AND OF PREFERRED EMBODIMENTS OF THE PRESENT INVENTION

The present invention is based on the building of a three-dimensional objects by means of mask exposure which obviates a mechanism of slicing 3D model data. Thus, the present invention is a relatively simple system involving less complex algorithm or computer processing or software implementation. Further, although the amount of data can be reduced compared to the conventional slicing technique, additional information is made available, such that building parameters such as thickness of the layer to be solidified, fine exposure adjustment—especially at surface structures of the three-dimensional object—, exposure times, etc. can be more roughly or more finely controlled where appropriate. According to the present invention, it is only necessary to determine, suitably by superimposing an appropriate grid raster or voxel grid raster over a three-dimensional volume, whether there is an overlap between a certain pixel location in bitmap data and the three-dimensional model or not, and depending on the determination result, to set bitmap data and corresponding pixels to an energy output status or not. Thus, a stack of bitmap data or a two-dimensional data set respectively mentioned above can be formed, truly representing the 3D model information. Moreover, depending on overlapping characteristics, surface structures of the three-dimensional object can be accurately generated by appropriate bitmap control, which is most suitably carried out by allocating a grey value and/or a colour value to pixels in bitmaps (which bitmaps are part of the whole stack of bitmaps) which are associated with the surface structures. The generation of a bitmap data stack, or of a two-dimensional data set respectively mentioned above (steps a) or a') as indicated) can be executed simply by a virtual process, for example on a computer. Without intermediately forming a bitmap data stack, it is even possible to generate a bitmap mask on the fly during the 3D building process. The three-dimensional object can thus be efficiently and accurately produced in a relatively simple and easy manner.

Particularly preferred advantages, features and embodiments are further described in the following.

In comparison with the conventional layer data information based on the outer and inner contours within one cross section of the sliced data, according to the invention the three-dimensional model has not to be sliced upfront to data generation, and the information is derived directly from analyzing a model of the three-dimensional object.

The information may be stored in a 2½ dimensional format in that way, that each raster/grid point in XY contains the Z-information of all entrance and exit points of the Z-Vector at that XY point passing through the object.

This 2½ D information stored in a matrix, which may correspond to the resolution raster of the display device or bitmap, is not necessarily stored in form of a stack of bitmaps and is not necessarily directly related to layers with a specific layer thickness. Layer thickness to be solidified may be varied depending on the data structure.

The 2½ D information file can be send to the machine, where the actually needed layer information can be generated "on the fly" depending on the Z hight/position of the layer.

Job files, possibly with different layer thicknesses and even with dynamic thickness adjustment, can be derived from the same file of 2½ D information directly on the machine just by determining the layer thickness or ranges of different layer thicknesses (for dynamic adjustment). It is not necessary to slice the object into determined layers/cross sections to achieve the build information.

The data processing describes the build information of the whole build envelope, a bounding box of a three-dimensional model, or a volume of arbitrary size including the 3D model completely or partly. Hence, the three-dimensionally volume typically includes not only the 3D model. Different parts of a three-dimensional object can be produced together or separately depending on the adjustment of the build volume.

By calculating the three-dimensional intersection, or an approximation thereof, of a three-dimensional model and grid elements such as voxel elements, it is possible to adjust/control the light intensity at that position by allocating or assigning a grey value and/or colour value to the pixel, which correlates to the grade of intersection.

In a preferred embodiment of the first and second aspects of the invention, overlapping is determined in lines or areas respectively projected from the grid raster through the three-dimensional volume. Alternatively, the grid raster is a voxel grid raster being superimposed over the three-dimensional volume, and overlapping is determined between voxels of the voxel grid raster and the three-dimensional model. These measures provide efficient algorithms for determining and/or calculating the overlapping.

In a preferred embodiment of the first and second aspects of the invention, the bitmap mask is generated from one or more bitmaps for XY plane, and when superimposing the grid raster over the three-dimensional volume, the grid raster is generated (i) from squares in the XY plane respectively corresponding to a sub-pixel, a pixel or multiple pixels of the bitmap, and (ii) from partitions in the Z direction perpendicular to the XY plane. However, grid raster may be alternatively generated (i) from squares in the XY plane different from a raster of the bitmap. Further, the partitions in the Z direction perpendicular to the XY plane may be set independent from a layer thickness to be solidified in the later building process. In further embodiment, which are made feasible by the present invention, raster elements of the grid raster may have either the same size, or they may have varying sizes in the XY plane.

In the device according to the present invention, it is thereby possible but sufficient to set an energy output level of pixels depending on the determination, to lie within or outside of the three-dimensional model or to lie between points corresponding to entry information and exit information respectively, by an overlap between a three-dimensional volume completely or partially enclosing the three-dimensional model and a grid raster projection superimposing the three-dimensional model. In a preferred embodiment of the device, it is likewise efficient that an energy output level of pixels is determined by an overlap between the three-dimensional model and lines or areas respectively projected from a grid raster through the three-dimensional volume which includes the three-dimensional model. It is likewise efficient for the device that, alternatively, an energy output level of pixels is determined by an overlap between the three-dimensional model and a voxel grid raster superimposing the three-dimensional volume which includes the three-dimensional model.

These different possibilities renders the system of the present invention very flexible to demands and desires of producing the three-dimensional object, especially depending on necessities and desires of providing fine or rough structures. For example, for volume parts where no information or only few information is obtained from the overlap analysis, rough rasterisation can be applied to the bitmap mask, whereas for volume parts where a lot of information or detailed information is obtained from the overlap analysis, fine rasterisation can be applied to the bitmap mask. Thus rough and fine rasterisation can be combined where appropriate. This also reduces the amount of data to be saved, stored or processed during the whole production method.

In a preferred embodiment of the first and second aspects of the invention, the stack of bitmap data (either provided in step a) or generated from the two-dimensional data set from step a')) includes a stack of multiple bitmaps for XY plane, and raster points of bitmaps representing pixels in the Z direction are set to an energy output status in the region between an entrance point or entrance area and an exit point of a line or area respectively projected from the corresponding grid raster in the Z dimension through the three-dimensional model. The provision or generation of stack of bitmap data in this manner significantly reduces the amount of data to be saved, stored and/or processed.

In a further preferred embodiment, the saved data on transition information in the two-dimensional data set are sent to a device for producing the three-dimensional object comprising the imaging unit, and when performing solidification in step b), one or more bitmap masks is(are) generated "on the fly" using the transition information provided in step a). By this measure, the actually needed layer information can be generated directly from the two-dimensional data set during the building process (i.e. on the fly) depending on the actual Z height or Z position of the layer.

In a preferred embodiment of the first aspect of the invention, the bitmap stack provided in step a) comprises only bitmaps which differ from each other. Similarly, in a preferred embodiment of the second aspect of the invention, the two-dimensional data set provided in step a') is used to generate a bitmap stack, or to directly generate bitmap masks, which bitmap stack or bitmap masks comprises only bitmaps which differ from each other. By this measure, the information finally used in the building process is reduced to the information actually needed in the solidification of layers. In particular, multiple layers requiring the same building conditions, especially on the circumferential structure and/or the thickness, may be solidified by commonly using a same bitmap mask, whereas other layers requiring different building conditions, especially on the circumferential structure and/or the thickness, may be solidified by using the different bitmap masks, respectively. Further, the same bitmap may be used for more than one layer to be solidified. Alternatively or in combination, the same bitmap may be used multiple times for an individual layer.

In a preferred embodiment of the first and second aspects of the invention, when superimposing a grid raster over the three-dimensional volume, each grid raster unit comprises multiple projected lines, and a grey value and/or a color value is allocated to a corresponding raster element representing a sub-pixel, a pixel or multiple pixels of a bitmap when the determined overlappings in the respective projected lines differ from each other. Alternatively, determining whether there is an overlap includes a determination of a degree of overlap, and as a result thereof, pixels in a generated bitmap mask are specifically set to a ratio of energy output depending on the degree of overlap. In a further preferred embodiment, the degree of overlap is determined between voxels of a voxel grid raster and a three-dimensional model, and pixels in a generated bitmap mask are set to a gray value and/or a color value when the degree of overlap is below 100% and above 0%. Accordingly, in the device according to the present invention the imaging unit is controllable by adjusting and/or controlling the energy output level via a specific gray value and/or color value. These measures allow for obtaining more or less detailed information about certain structures such as surface structures, and thus for a fine adjustment of building parameters.

In a preferred embodiment of the first and second aspects of the invention, a thickness of layers formed by solidifying the solidifiable material is controlled to obtain same and/or different thicknesses, depending on the data structure of bitmap data provided in the stack of bitmap data, or depending on the data structure in the two-dimensional data set. As a further possibility made feasible by the invention, the thickness may be the same in certain Z dimensional ranges, but may be different in other Z dimensional ranges as needed or desired. Varying thickness control further expands the flexibility of the system according to the present invention.

In the device according to the invention, a raster of the imaging unit comprises a predetermined number of discrete imaging elements (pixels) arranged as a dot, a line or as a matrix, wherein the imaging unit composes a layer image pixel-specific from the bitmap data. This enables a precise solidification of the solidifyable material depending on the provided information data.

The computer or the data carrier according to the present invention are valuable products which are respectively effective for controlling bitmap masks of an imaging unit of a device for producing a three-dimensional object. In a preferred embodiment of the computer or the data carrier according to the present invention, the information on energy output level is determined by an overlap as described above. In particular, the two-dimensional data set may be arranged to generate a bitmap stack, or it may be arranged to generate at least one bitmap of on the fly without generating an intermediate bitmap stack. It is particularly advantageous that bitmap masks, which are provided by a bitmap stack in a computer or a data carrier or which is generated from the two-dimensional data set, comprise only bitmaps which differ from each other.

The bitmap data stack, or the two-dimensional data set may be saved or stored in a job file together with information on building parameters. In a particular aspect of the present invention, a two-dimensional data set is saved or stored in a computer or a data carrier as an information in a quasi 2½ dimensional format, comprising: information on an XY point of a raster grid superimposed over a three-dimensional volume completely or partially including the three-dimensional model; and entry information and exit information as a quasi Z dimensional information for respective raster grid elements in XY. A rasterization in the Z direction can thus be omitted. Further, such two-dimensional data set is effective and sufficient for generating a building data package in combination with corresponding exposure curves. Further, each bitmap mask may be used with varying exposure times to produce correspondingly variable hardening depths.

DETAILED DESCRIPTION OF PREFERRED EMBODIMENTS OF THE PRESENT INVENTION

In the following, principles, objects, preferred features and advantages of the present invention are described in more detail by referring to preferred embodiments of the present invention in connection with the accompanying drawings, noting however that the description is illustrative only and by no means limits the present invention.

Figure 2:
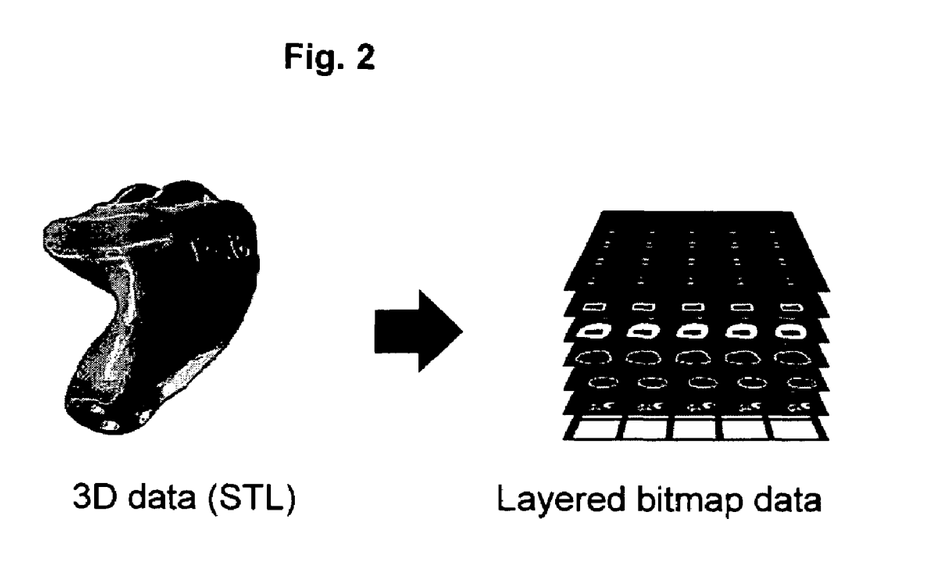
FIG. 2 schematically and illustratively shows a scheme demonstrating transformation of three-dimensional object data into two-dimensional bitmap data in accordance with an embodiment of the present invention.

A scheme for schematically illustrating a basic principle of the present invention is shown in FIG. 2. The basis concept resides in that for each pixel of a bitmap mask used for the exposure of a layer of the three-dimensional volume enclosing the three-dimensional object to be solidified, it must be determined and decided only whether it lies within or outside of a 3D model of the three-dimensional object. As further shown in FIG. 2, determination of overlappings and pixel settings are carried out for all bitmap layers of a bitmap stack. Thus, by any one of possible embodiments used for transforming 3D model data into bitmap data, a stack of bitmap data can be formed to generate respective bitmap masks for the exposure of solidifiable material. Each bitmap data and correspondingly bitmap mask may be used to expose one or several layers of a three-dimensional object to be produced. According to the present invention, a mechanism for slicing 3D data to generate layered 2D data for cross-sectional areas is obsolete, and there is no requirement of calculating sectional contours as in the prior art shown schematically in FIG. 1.

Figure 3:
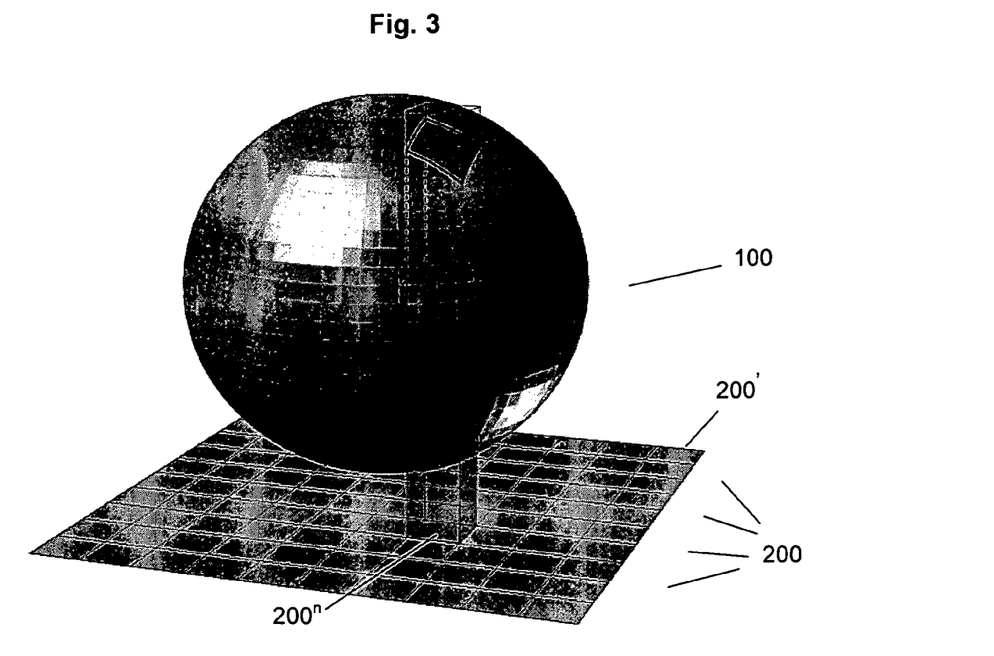
FIG. 3 schematically shows an embodiment of the invention how a grid raster may superimpose over a 3D volume enclosing a three-dimensional object to be produced, which is exemplified by a form of a sphere.

FIG. 3 schematically shows an embodiment according to the present invention, wherein a grid raster is superimposed over a three-dimensional volume which encloses, at least partially, a three-dimensional model of a three-dimensional object to be produced. Here, for a 3D model shown in the form of a sphere 100, a grid raster 200 is imposed virtually over the three-dimensional volume. Based on this grid rasterisation, it is determined whether, in respective unit areas of the grid raster projected from the grid rasterisation 200, there is an overlap with the 3D model or not. This is respectively demonstrated in FIG. 3 for an n-th grid raster unit 200″ for the case of an overlap, and for a grid raster unit 200′ when there is a lack of overlap.

Possible approaches how to determine an overlap between the grid raster and the 3D model will be described in the following with respect to FIGS. 4A, 4B and 4C respectively. Same elements are denoted by same reference signs.

Figure 4:
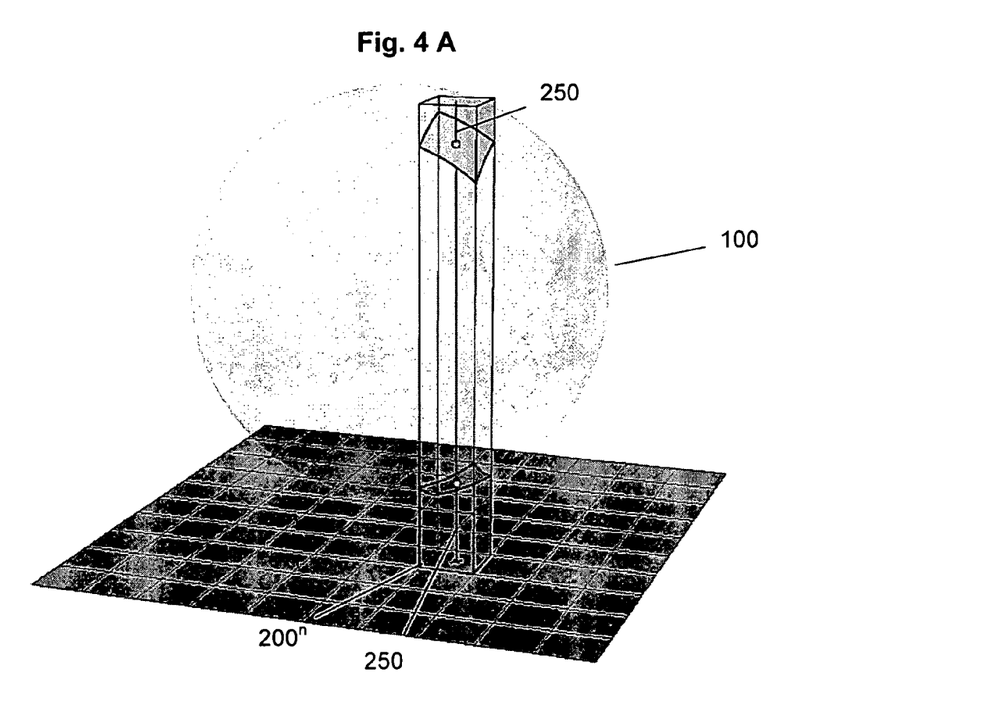
FIG. 4A shows an embodiment according to the present invention, exemplifying an approach to determine an overlap or lack of overlap along lines projected from a grid raster superimposed as shown in FIG. 3.
FIG. 4B schematically shows another embodiment, exemplifying another approach to determine an overlap or lack of overlap along lines projected from sub-raster points of a grid raster superimposed as shown in FIG. 3.
FIG. 4C schematically shows another embodiment of the present invention, exemplifying still another approach to determine whether there is an overlap or lack of overlap of areas protected from a grid raster as superimposed as shown in FIG. 3.

According to the embodiment shown in FIG. 4A, lines are virtually projected from each centre of respective grid raster unit (representatively shown by line 250 for the n-th grid raster unit 200″ of FIG. 3). Placing the grid raster into the XY plane (which corresponds to an XY building plane for building layers in corresponding XY planes of the three-dimensional object to be produced), the line 250 is projected parallel to the Z-axis (i.e. along the Z dimension), and it is determined at which Z points/heights of the Z-axis (or Z dimension) the projected line 250 enters the 3D model, and at which point or height of the Z-axis (or Z dimension) the protected line 250 exits the 3D model (indicated by circular points in FIG. 4A). For setting bitmap data, which may be provided in advance or which may be advantageously generated "on the fly" when needed at the build process, it is determined for each grid raster unit corresponding to a respective raster unit of the bitmap, whether or not the Z value is between an entering point and an exit point: if this is the case (for example in grid raster unit 200″ between the entrance and exit points shown in FIG. 4A), all corresponding pixels of bitmap data in the Z dimension are set to an energy output status (for example, for outputting white light); if this is not the case (for example as shown for grid raster unit 200′ in FIG. 3, or for such bitmap data lying below the entrance point or above the exit point in the grid raster unit 200″ shown in FIG. 4A), corresponding pixels of bitmap data in the Z dimension are set to a status of no energy output (for example blocking light output; or black colour value). From the bitmap data thus generated, comprising a stack of XY bitmap data like the one illustrated in FIG. 2 and containing the information on the energy output status (i.e. energy output or white light status; or energy blocking or black light status) obtained from the aforementioned overlapping analysis, an imaging unit of a 3D-object producing device can be controlled to form exposure masks corresponding to respective bitmap layers. Accordingly, pixels of an exposure mask of the imaging unit of the 3D-object producing device, by means of a computer unit such as a CPU, an IC and/or a software implementation, are correspondingly set, pixel-specifically, to an ON or OFF state, respectively, based on the corresponding bitmap data. A three-dimensional object, e.g. represented by the spherical 3D model 100, is thus physically produced by layered-wise exposure corresponding to respective bitmap data in a highly effective and easy manner.

FIG. 4B shows a preferred embodiment of the present invention, by which surface structures of a three-dimensional object, corresponding to surfaces of a 3D model, can be produced more accurately by means of grey value and/or colour value control. In order to obtain information on surface structures, the following approach may be adopted. Instead of one line projecting from an individual grid raster unit, multiple lines, e.g. four lines $250^1$, $250^2$, $250^3$ and $250^4$, are projected from an individual grid raster unit. In an embodiment shown in FIG. 4B, these lines are projected from respective centers of sub-raster elements composing a grid raster unit 200″. Projection is made, in a virtual process, parallel to the Z axis, and it is determined again at which point or height the Z axis the projected lines enter into the 3D model and at which point or height of Z axis the lines exit the 3D model. For allocating a grey value and/or a colour value from a grid raster unit to a corresponding pixel of the bitmap and thus of the exposure mask, it is determined which sub-elements of a grid raster unit in the Z dimension comprise locations between an entrance and an exit point. From the sum of the sub-raster elements where this is the case, a corresponding grey value and/or colour value is associated with the grid raster unit and thereby allocated to the corresponding pixel in the bitmap data. For example, if the determined overlappings in the respective projected lines drawn from the centers of sub-units of a grid raster unit differ from each other, a grey value and/or a colour value is allocated to the corresponding pixel of the bitmap in the bitmap data.

Pixels in bitmap layers between entry and exit point are set to energy output status, and pixels in bitmap layers below the entry point and above the exit point are set to status of no energy output. In a preferred embodiment, the level of grey value and/or colour value is determined and set in the corresponding bitmap data based on a deviation of the overlappings of the multiple projected lines (i.e. of $250^1$, $250^2$, $250^3$ and $250^4$) from the mean value of these overlappings per raster grid unit (i.e. 200″). For example, the lower the deviation per grid raster unit, the lower the level of grey value or colour value may be set. This manner of determination and setting may be suitably applied to the surface portions of the upper and/or lower hemisphere of the spherical form shown in FIG. 4B.

In other surface portions, for example an equatorial section of the spherical form shown FIG. 4B, there may be grid raster units whose sub-units partly do have an overlap, whereas a remaining part thereof will not have an overlap with the three-dimensional model (not shown). In this case, the degree of grey value and/or colour value can be determined depending on the ratio of those multiple projected lines per grid raster unit which do have an overlap, relative to those which do not have an overlap with the three-dimensional model. Partial overlappings in sub-raster elements may thus be determined and subsequently used for setting bitmap data for providing additional useful information for grey value and/or colour value control.

In this embodiment, it will become apparent that the determination and setting for bitmap data of surface structures will have a tendency towards higher accuracy with an increasing number of sub-rasterisation of grid raster units, and correspondingly with an increasing number of virtual lines projected form individual grid raster units. Accuracy the surface structures may thus be adjusted according to a desire or demand for a corresponding three-dimensional object.

Another approach is shown in FIG. 4C. In this embodiment, an area is projected in a virtual process from a grid raster unit, such as a square being projected in a column-like form to be superimposed with the three-dimensional model, as shown in FIG. 4C for the 200″ grid raster unit. As described above, it is likewise determined whether there is an overlap with the 3D model, as shown in FIG. 4C in the range of Z between the two lower and upper cross-sectional areas denoted by reference signs 300A and 300B, respectively, and corresponding areas in the bitmaps of the bitmap data are set to the energy output status (e.g. for white light exposure). If the Z point or height is located in the cross-sectional area region 300A or 300B, the actual overlapping area is calculated and, depending on the result of this calculation, a corresponding grey value and/or colour value is set and allocated to the corresponding part of the bitmap in the bitmap data.

An area representing a grid raster unit (e.g. 200″) may correspond to one pixel, to a part of a pixel, or to a group of multiple pixels in the bitmap and thus in the bitmap mask.

Figure 5:
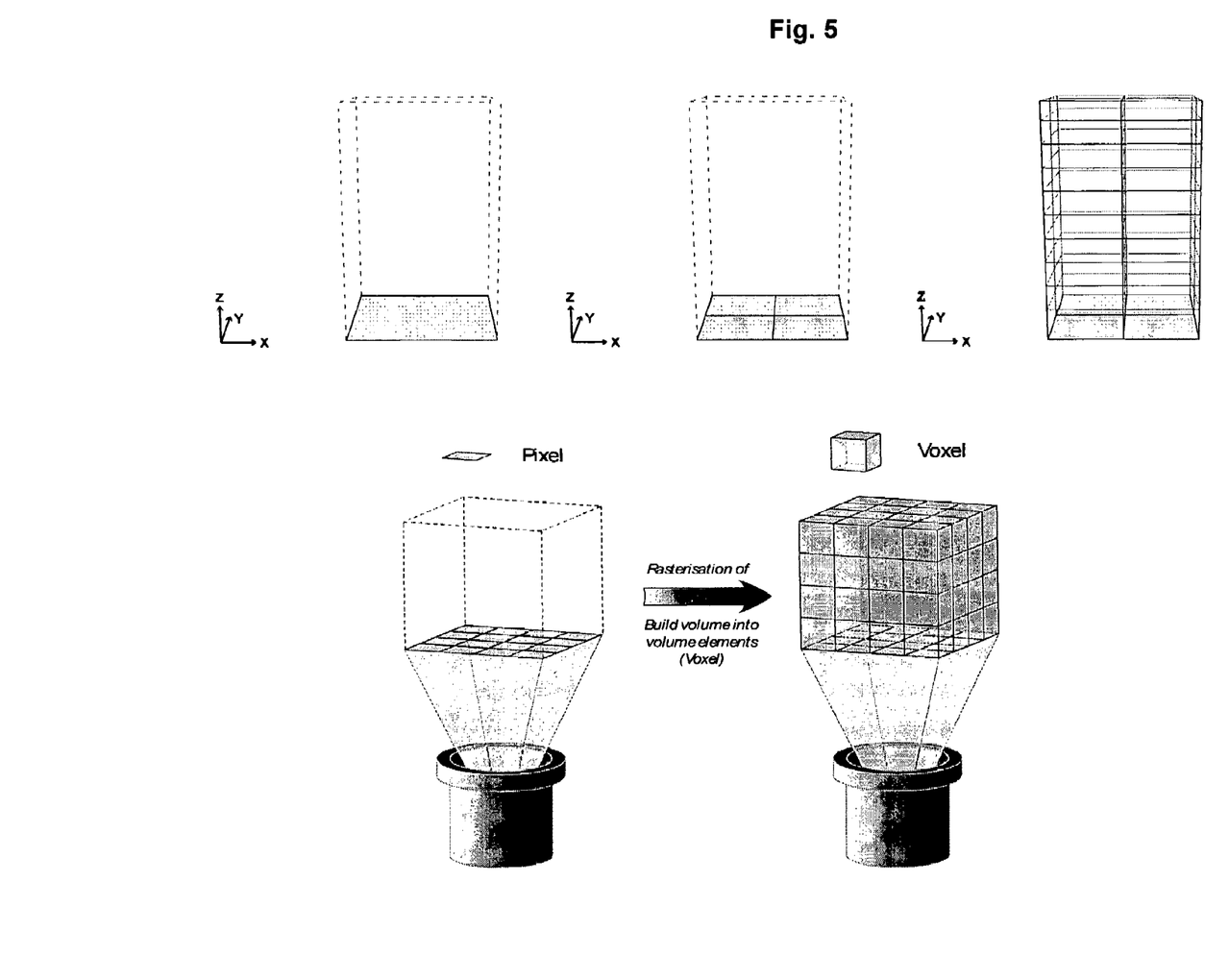
FIG. 5 shows another embodiment of the invention involving a process of superimposing a voxel grid raster over a 3D volume.

Another embodiment for providing a bitmap data from a 3D model in accordance with the present invention based on a so called direct voxel rasterisation of a 3D model is schematically shown in FIGS. 5 and 6A to 6F. First, as shown in FIG. 5 (partly in the upper row and comprehensively in the lower row), a matrix is defined by a virtual voxel grid. Thereby, a voxel grid raster is generated from squares in XY plane to correspond to a pixel rastering of a bitmap in the bitmap data stack und thus to correspond to a pixel rastering of an exposure mask for an exposure by an imaging unit of 3D-object producing device. Here, the square size in the XY dimensions of the voxel grid raster corresponds to the size of a pixel in the bitmap. It may instead correspond to a multitude or a fraction of the size of a pixel in the bitmap (corresponding to respective bitmap masks of the imaging unit of the 3D-object producing device). In a virtual process the voxel grid shown in FIG. 5 is superimposed over a three-dimensional volume enclosing a 3D model, and subsequently overlappings are determined and bitmap data are set to generate bitmap data stack (generated in a advance or on the fly as mentioned above).

To illustrate the process the order of FIGS. 6A to 6F schematically show how this can be executed. The drawings on the left side illustrate this principle three-dimensionally in XYZ, whereas the drawings on the right side show a 2D-illustration in an XZ plane, respectively.

Figure 6:
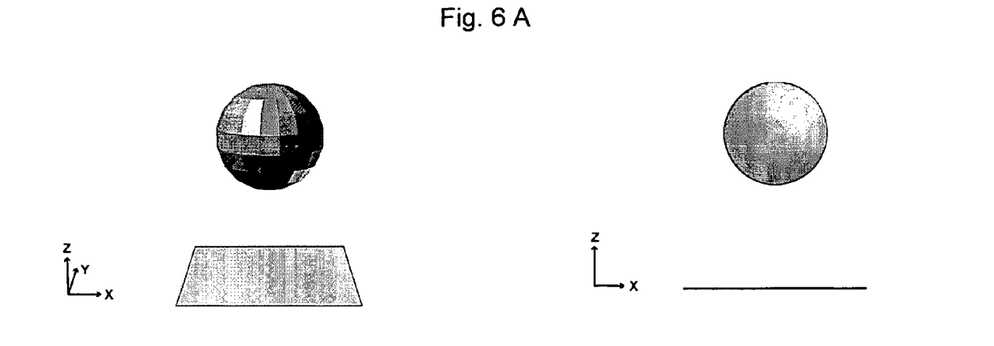
FIGS. 6A to 6F schematically show steps in a process for transforming voxel grid raster information into a stack of bitmaps in accordance with another embodiment of the present invention.

As shown in FIG. 6A, a build envelope corresponding to a projected area of the imaging unit of the 3D object-producing device is formed. As specifically shown in the left and right illustrations of FIG. 6A, a sphere of 3D model data can be placed over the build envelope. As further shown in FIG. 6B, the projected picture in the XY plane corresponds to a bitmap image composing a matrix of squared picture elements (pixels).

For each voxel grid unit corresponding to a pixel element of the bitmap and thus of the bitmap mask for exposure, a line is projected from the center in the Z direction, as shown in FIG. 6C.

Then, as shown in FIG. 6D, an estimation is carried out of the intersection points of every projected line with this sphere model (in the left 3D illustration), or with the circle (in the right 2D illustration). There are two different types of intersection points: In a first type, the protected line is going into the 3D model: this intersection is defined as entry point. In a second type, the projected line leaves the 3D model: in this case, the intersection is defined as exit point. In the 2D illustration of FIG. 6D, the entry points of respective projected lines are shown by crossing symbols, whereas exit points of the projected lines are shown by square symbols.

Next, the set of estimated intersections is used to approximate the amount of overlapping of model volume or model area within a voxel grid element (voxel raster unit). Now, there is no longer a relationship to the original 3D model. This is illustrated in FIG. 6E by overlapping lines between entry points and exit points of the voxel grid raster. Saving entry and exit points of each raster element, if such entry and exits points occur, produces a data package comprising a rastered representation of the 3D volume and thus of a 3D model included therein. This rastered representation can then be used to build a complete bitmap stack in advance to be subsequently sent to a 3D object-producing device, or can be sent directly to the 3D object-producing device to generate appropriate bitmap masks during the building process (on the fly).

As shown in FIG. 6F, every voxel or volume pixel range that lies between an entry point and an exit point of its correspondingly projected line is set to a status of full overlapping with the 3D model and thus is set in the bitmap data to an energy output status (for example, light output or white colour). All other voxels or volume pixel ranges are set to a complete lack of overlapping by the 3D model and thus is set in the bitmap data to a status with no energy output (light output blocking or black colour). The information in a voxel plane, i.e. in the XY plane corresponding to a voxel element, is used to generate a bitmap mask. The bitmap mask for exposure contains black pixels for areas which should be not cured and white pixels for areas where the photopolymer should be cured.

For those layers to be solidified with no difference in the outer dimensions, the same bitmap mask can be used several-fold. Thus, there is no necessity of generating a new bitmap mask for every new layer to be hardened.

With the system according to this embodiment described above, a 3D-object producing device uses a mask projection system which is capable of projecting millions of squared light spots arranged in a matrix, the matrix being composed of corresponding voxel elements described above.

In the following, other embodiments of the present invention will be described by reference to FIGS. 7A to 7C. First, as shown in the left part of FIG. 7A, a voxel grid raster is superimposed over a 3D volume enclosing a 3D model (shown here again in the form of a sphere). Next, as shown by the transformation from the left side to the right side of FIG. 7A, it is determined whether there is an overlap between respective voxel elements of the voxel grid raster with the 3D model or not. Depending on the result of the determination, bitmap data corresponding to respective voxel elements are set to a status of energy output or not.

Figure 7:
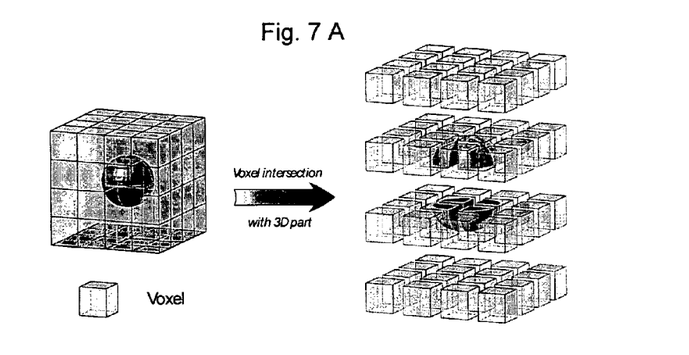
FIG. 7A to 7C schematically show steps in a process for determining voxel grid overlappings and bitmap data settings in accordance with an embodiment of the present invention.

According to a preferred embodiment, colour coding by suitable grey values and/or colour values depending on the size of the overlap, i.e. the size of the intersection area/volume, is carried out as shown in FIG. 7B. Specifically, as shown in the illustration on the left side of FIG. 7B, a colour code is set to "black" if there is no intersection area/volume overlap, a grey value of approximately intermediate level is set for an intersection area/volume of about 40%, and a colour code "white" is set for an intersection area/volume of 100% in respectively rastered voxel elements. The colour codings of overlapping intersection areas/volumes between a voxel matrix and a 3D model is generated for the whole build volume rastered by the voxel grid raster, as shown in the middle illustration of FIG. 7B, and is then further transformed into the bitmap data settings of corresponding XY voxel planes of bitmap data, as indicated in the right-side illustration of FIG. 7B. For this processing, FIG. 7C specifically shows the conversion of colour codings of the overlapping intersection areas/volumes between every voxel element and the 3D model (see left illustration in FIG. 7C) into pixel-specific intensity values (comprising black, white and grey values), depending on the result of the overlapping determination (see middle illustration of FIG. 7C). At the end (see right illustration in FIG. 7C), the build volume is rastered into a stack of bitmaps being composed of respective bitmap data. Based on the generated bitmap stack, an imaging unit of a 3D-object producing device is controlled, wherein every bitmap mask for one or more corresponding layer(s) to be solidified contains energy output intensity values, including areas of black pixels which should not be cured, areas of white pixels where a photopolymer should be fully cured, and a areas of grey pixels with a reduced level of curing. With this embodiment, a three-dimensional object can be efficiently produced with high accuracy even in surface structures. Further, as becomes apparent from FIG. 7C, respectively two bitmaps of the bitmap stack resemble each other, namely the bottom and top bitmaps representing only black pixels, and both middle bitmaps representing black and grey pixels. For such an exemplified situation the whole bitmap stack could be reduced to a half of the bitmaps (e.g. the first and second ones from the bottom) while keeping the whole information for all layers to be solidified, hence reducing the amount of data to be saved, stored and/or to be processed.

In the above description, principles and embodiments of the invention have been specifically exemplified. However, it will be come apparent to a person skilled in the art that various variations and modifications are possible. Of course, any desired shape of the 3D model and correspondingly the three-dimensional object can be produced. Also, only a portion of a three-dimensional object may be produced by the present invention. Furthermore, the principle of the invention as described and embodied above may be applied to more complex 3D structures. For example, there may be a multitude of overlapping portions interrupted in the Z dimension of a 3D model with lines or areas projected from a grid raster, or with voxel elements of the voxel grid raster, while still applying the principles of the present invention. Furthermore, the steps of providing bitmap data on the one hand and of performing solidification of a material on the other hand may be carried out inter-actively or simultaneously, or may be carried out separately in time and/or location, or any combination thereof. In one embodiment, the bitmap data (in the form of a bitmap stack or of a two-dimensional data set as described above) can be provided at a location remote from the location where the actual solidification performing process is carried out.

Valuable technical products for assisting in the performance of the method and for executing the device of the present invention, such as a computer or a data carrier respectively storing a bitmap data stack or a two-dimensional data set as described above, are also provided by the present invention.

Figure 8:
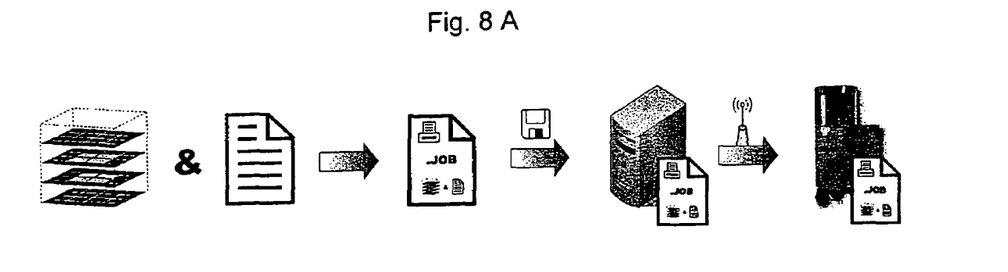
FIG. 8A schematically illustrates a data carrier and/or a computer storing a bitmap data stack and additional parameters useful in accordance with an embodiment of the present invention.
FIG. 8B schematically illustrates a data carrier and/or a computer storing a data set of transition information and additional parameter useful in accordance with an embodiment of the present invention.

FIGS. 8A and 8B schematically illustrate embodiments of a computer or a data carrier of the present invention. Accordingly, a stack of bitmaps corresponding to a build volume of a three-dimensional object to be produced comprises, for layers to be solidified, information data on an energy output level adapted for controlling an imaging unit which comprises a number of pixels suitably but not necessarily corresponding to the rasterisation of the bitmap. This bitmap stack is combined with corresponding build parameters for every bitmap mask, to thereby create a job file. Build parameters may include, but are not limited to selected layer thickness of respective layers to be solidified for building a three-dimensional object, exposure times per bitmap mask, number of exposures per layer to be solidified, information on selected light source and optionally on selected wavelengths, etc. The thus created job file can be stored on a data carrier such as a disk. It may be transferred to, or is alternatively directly stored in a computer. The computer may further comprise a CPU and software implementation for executing the job file as illustrated in FIGS. 8A and 8B. The job file can be executed for controlling an imaging unit of a 3D-object producing device either directly with appropriate signal linings therebetween, or online or in a remote manner via suitable signal transfer, or a combination thereof. As exemplified in FIG. 8B and similar to the above description in connection with FIG. 7C, before data are saved/stored on a data carrier and/or a computer, a whole stack of bitmap data is reduced to a minimum number of bitmaps necessary for constructing the three-dimensional object or a part thereof, hence reducing the amount of data to be saved, stored and/or to be processed.

Figure 9:
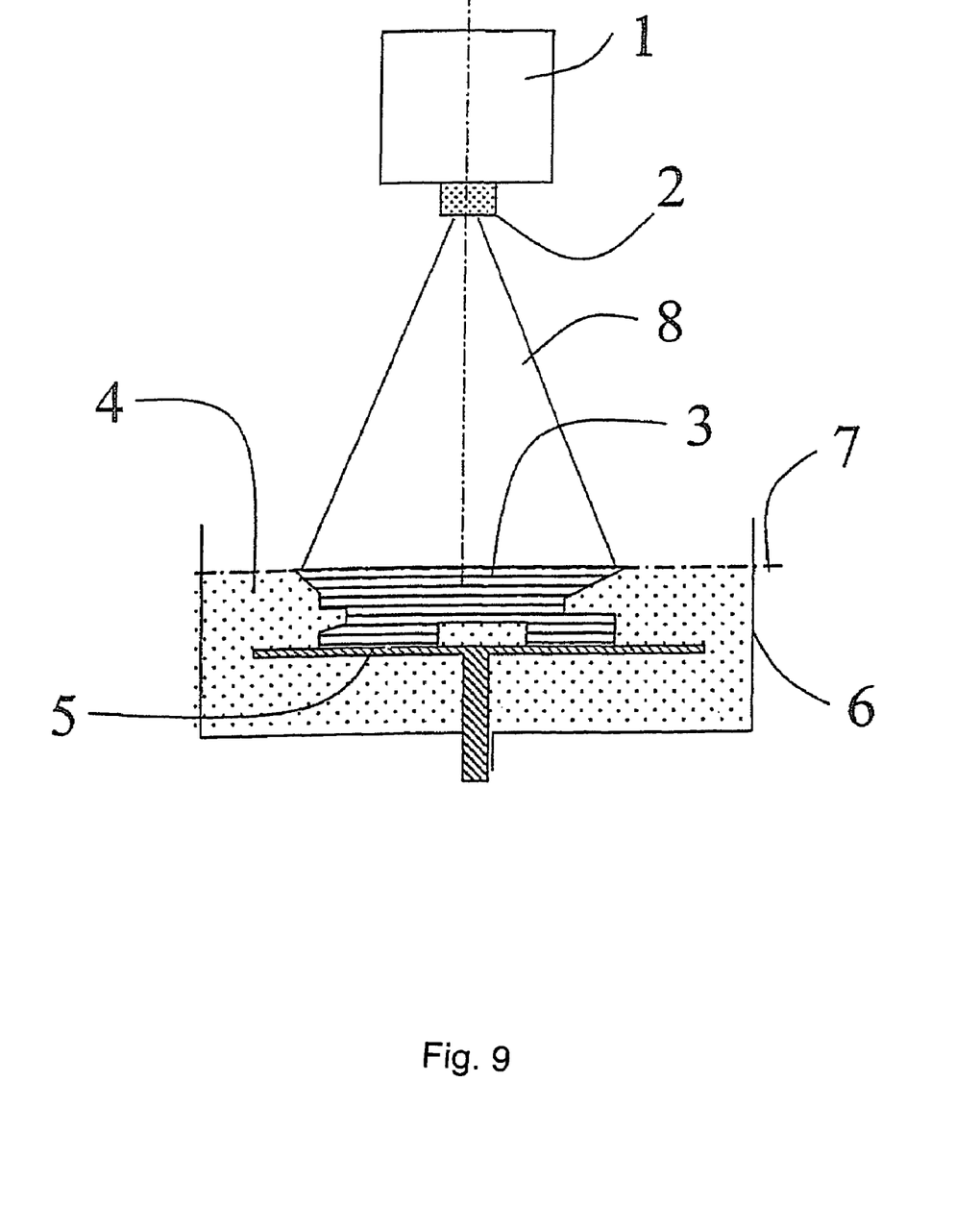
FIG. 9 schematically shows an example of a device for producing a three-dimensional object, to which the method and the system according to the present invention can be applied.

An illustrative embodiment of a possible 3D-object producing device is shown for illustrative purposes in FIG. 9. The device for layer-wise producing a three-dimensional object 3 by layered hardening of a photo-hardening material 4 includes mask projection 8, wherein the projection unit 1 with imaging optics 2 is provided above basin 6, filled with photo-hardening material 4. The object 3 is hardened in layers on a carrier plate 5 which can be moved in vertical direction within the basin 6.

With a method based on photo-polymerization, the light radiation necessary for hardening is projected into the processing level. Exposure is effected for example by means of a multimedia projector. The image is composed by individual image points (pixels) of a bitmap. The bitmap mask can be formed by a Spatial Light Modulator with the pixels being arranged in a mutually spatially fixed manner in the plane. A currently standard, exemplary resolution for such semiconductor elements is SXGA+1400×1050 pixels.

The imaging unit which can be used for being controlled in according with the present invention may not only be a multimedia projector, but further includes, for example, a LC display (reflexive or transmissive), a LED or laser diode line (which is moved over the layer orthogonally to the line), a light valve technology apparatus (MEMS technology), or the like.

Furthermore, the level of energy output status, such as light output level for the exposure of a bitmap mask, can be adjusted by means which are known. For example, the levels may comprise:

a1) ON and OFF states, by an essentially complete energy transmission (white) or, respectively, by an essentially complete energy blocking without energy transmission (black), in transmissive systems (especially with light valves); or a2) ON and OFF states, by an essentially complete energy reflection into the optical axis (white in the projection image) or, respectively, by an essentially complete reflection out of the optical axis into an optical absorber (black in the projection image), in reflexive systems (in particular in a Digital Micromirror Device [DMD] or a Liquid Crystal on Silicon [LCOS] for digital light processing [DLP]); and additionally b1) a predetermined, desired number of gray levels, or b2) a predetermined, desired number of color values. The color values can represent a color tone and/or a color density or, respectively, intensity.

Although, the present invention has been described in detail above by referring to specific embodiments and illustrative drawings, the present invention is by no way limited thereto. Rather, it becomes apparent that various variations and modifications are possible, and the present invention is defined only by the spirit and scope of claims attached herewith.

The invention claimed is:

1. A method for producing a three-dimensional object by solidification of a material solidifiable under the action of electromagnetic radiation by means of energy input via an imaging unit comprising a predetermined number of discrete imaging elements (pixels), comprising the steps of:
   a) providing a stack of bitmap data from a three-dimensional volume completely or partially enclosing a three-dimensional model of at least a part of the three-dimensional object to be produced, wherein the stack of bitmap data had been generated by a process including:

superimposing a grid raster over the three-dimensional volume completely or partially enclosing the three-dimensional model, determining whether there is an overlap with the three-dimensional model, and setting bitmap data to an energy output status where an overlap has been determined, or setting bitmap data to a status of no energy output where no overlap has been determined; and b) performing solidification with exposure using a bitmap mask formed from the stack of bitmap data provided in step a).

2. The method according to claim 1, wherein overlapping is determined in lines or areas respectively projected from the grid raster through the three-dimensional volume.

3. The method according to claim 1, wherein said grid raster is a voxel grid raster being superimposed over the three-dimensional volume, and overlapping is determined between voxels of the voxel grid raster and the three-dimensional model.

4. The method according to claim 1, wherein the bitmap mask is generated from one or more bitmaps for an XY plane, and when superimposing the grid raster over the three-dimensional volume, the grid raster is generated (i) from squares in the XY plane respectively corresponding to a sub-pixel, a pixel or multiple pixels of the bitmap, and (ii) from partitions in the Z direction perpendicular to the XY plane.

5. The method according to claim 1, wherein the bitmap mask is generated from one or more bitmaps for an XY plane, and when superimposing a grid raster over the three-dimensional volume, the grid raster is generated (i) from squares in the XY plane different from a raster of the bitmap, and (ii) from partitions in the Z direction perpendicular to the XY plane.

6. The method according to claim 1, wherein raster elements of the grid raster have either the same size or varying sizes in the XY plane.

7. The method according to claim 1, wherein the three-dimensional volume is constituted by a build envelope, a bounding box of the three-dimensional model, or a volume of arbitrary size.

8. The method according to claim 1, wherein a bitmap stack provided in step a) comprises only bitmaps which differ from each other.

9. The method according to claim 1, wherein, when superimposing a grid raster over the three-dimensional volume, each grid raster unit comprises multiple projected lines, and a grey value and/or a color value is allocated to a corresponding raster element representing a sub-pixel, a pixel or multiple pixels of a bitmap when the determined overlappings in the respective projected lines differ from each other.

10. The method according to claim 1, wherein determining whether there is an overlap includes a determination of a degree of overlap, and as a result thereof, pixels in a generated bitmap mask are specifically set to a ratio of energy output depending on the degree of overlap.

11. The method according to claim 10, wherein the degree of overlap is determined between voxels of a voxel grid raster and a three-dimensional model, and wherein pixels in a generated bitmap mask are set to a gray value and/or a color value when the degree of overlap is below 100% and above 0%.

12. The method according to claim 1, wherein a thickness of layers formed by solidifying the solidifiable material is controlled to obtain same and/or different thicknesses, depending on the data structure of bitmap data provided in the stack of bitmap data.

13. A method for producing a three-dimensional object by solidification of a material solidifiable under the action of electromagnetic radiation by means of energy input via an imaging unit comprising a predetermined number of discrete imaging elements (pixels), comprising the steps of:

a) providing a stack of bitmap data from a three-dimensional volume completely or partially enclosing a three-dimensional model of at least a part of the three-dimensional object to be produced, wherein the stack of bitmap data had been generated by a process including:

superimposing a grid raster over the three-dimensional volume completely or partially enclosing the three-dimensional model, determining whether there is an overlap with the three-dimensional model, and setting bitmap data to an energy output status where an overlap has been determined, or setting bitmap data to a status of no energy output where no overlap has been determined; and b) performing solidification with exposure using a bitmap mask formed from the stack of bitmap data provided in step a), wherein the provided stack of bitmap data includes a stack of multiple bitmaps for an XY plane, and raster points of bitmaps representing pixels in the Z direction are set to an energy output status in the region between an entrance point or entrance area and an exit point of a line or area respectively projected from the corresponding grid raster in the Z dimension through the three-dimensional model.

14. A device for producing a three-dimensional object by solidification of a material solidifiable under the action of electromagnetic radiation by means of energy input via an imaging unit comprising a predetermined number of discrete imaging elements (pixels), wherein the device comprises a computer readable medium having instructions for generating a stack of bitmap data, wherein the generation of the stack of bitmap data comprises a transformation from a three-dimensional volume which includes at least a part of a three-dimensional model of the object to be produced, wherein each bitmap data of the stack comprises information on an energy output level such that pixels corresponding to a location within the three-dimensional model are set to an energy output status, and pixels corresponding to a location outside the three dimensional model are set to a status of no energy output.

15. The device according to claim 14, wherein an energy output level of pixels is determined to lie within or outside of the three-dimensional model, or to lie between points corresponding to entry information and exit information respectively, by an overlap between a three-dimensional volume completely or partially enclosing the three-dimensional model and a grid raster projection superimposing the three-dimensional model.

16. The device according to claim 14, wherein an energy output level of pixels is determined by an overlap between the three-dimensional model and lines or areas respectively projected from a grid raster through the three-dimensional volume which includes the three-dimensional model.

17. The device according to claim 14, wherein an energy output level of pixels is determined by an overlap between the three-dimensional model and a voxel grid raster superimposing the three-dimensional volume which includes the three-dimensional model.

18. The device according to claim 14, wherein the raster of the imaging unit comprises a predetermined number of discrete imaging elements (pixels) arranged as a dot, a line or as a matrix, wherein the imaging unit composes a layer image pixel-specific from the bitmap data.

19. The device according to claim 14, wherein the imaging unit is controllable by adjusting and/or controlling the energy output level via a specific gray value and/or color value.

20. A computer programmed to control an imaging device and comprising a memory, wherein the computer is programmed to access a data structure stored in the memory, the data structure comprises a bitmap stack, each bitmap stack comprises energy output level information for controlling the imaging device, and the energy output level information comprises a predetermined number of discrete imaging elements (pixels) corresponding to a rasterization of at least one of the bitmaps in the bitmap stack.

21. The computer according to claim 20, wherein the energy output level information is determined by an overlap between a three-dimensional model and a projected grid raster or a voxel grid raster respectively superimposing a three-dimensional volume which completely or partially includes at least a part of the three-dimensional model, the three-dimensional model being composed of 3D data of a three-dimensional object to be produced by the imaging device.

22. The computer according to claim 21, wherein the bitmap stack comprises only bitmaps which differ from each other.

23. The computer according to claim 20, wherein the bitmap data stack, or the two-dimensional data set is stored in a job file together with information on building parameters.

24. The computer of claim 20, wherein at least some of the bitmaps in the bitmap stack include data that corresponds to a region of a three-dimensional object.

25. A computer-readable medium having instructions stored for execution by a computer processor to perform a method comprising:
  accessing a three-dimensional model of a three-dimensional object that is to be produced by solidification of a material solidifiable under the action of electromagnetic radiation by means of energy input via an imaging unit comprising a predetermined number of discrete imaging elements (pixels); and
  generating a stack of bitmap data from a three-dimensional volume completely or partially enclosing the three-dimensional model or at least a part thereof, the generating further including:
    superimposing a grid raster over the three-dimensional volume completely or partially enclosing the three-dimensional model;
    determining whether there is an overlap with the three-dimensional model, and
    setting bitmap data to an energy output status where an overlap has been determined, or setting bitmap data to a status of no energy output where no overlap has been determined.

26. An apparatus for producing a three-dimensional object by solidification of a material solidifiable under the action of electromagnetic radiation by means of energy input, the apparatus comprising:
  an imaging unit providing the energy input and comprising a predetermined number of discrete imaging elements (pixels);
  a storage medium containing:
    a stack of bitmap data, which are generated from a three-dimensional volume that includes at least a part of a three-dimensional model of the object to be produced, each bitmap data comprising energy output level information such that pixels corresponding to a location within the three-dimensional model are set to an energy output status, and pixels corresponding to a location outside the three-dimensional model are set to a status of no energy output, and
    instructions for generating a bitmap mask based on bitmap data of the stack for controlling the image unit;
  a basin for a photohardening material; and
  a carrier for carrying the object to be produced within the basin at a processing level in a projection region of the bitmap mask of the imaging unit.

27. The apparatus of claim 26, wherein the imaging unit is a spatial light modulator.

28. The apparatus of claim 27, wherein the imaging unit, or spatial light modulator respectively, comprises a number of semiconductor elements, the discrete imaging elements (pixels) of the imaging unit being represented by the semiconductor elements.

29. The apparatus of claim 26, wherein the imaging unit includes a reflexive system, a Digital Micromirror Device (DMD) or a Liquid Crystal on Silicon (LCoS) for digital light processing (DLP).

30. A method of producing a three-dimensional object by solidification of a material solidifiable under the action of electromagnetic radiation by means of energy input comprising:
  generating a stack of bitmap data from a three-dimensional volume completely or partially enclosing a three-dimensional model of the object or at least a part thereof, the generating step further including:
    superimposing a grid raster over the three-dimensional volume completely or partially enclosing the three-dimensional model,
    determining whether there is an overlap with the three-dimensional model, and
    setting bitmap data to an energy output status where an overlap has been determined or setting bitmap data to a status of no energy output where no overlap has been determined;
  controlling an imaging unit of a device for producing the three-dimensional object by creating a bitmap mask from bitmap data of the stack; and
  projecting the created bitmap mask onto a processing level above a carrier carrying the object provided within a basin filled with the photo hardening material.

31. The method according to claim 30, wherein the imaging unit is a spatial light modulator (SLM) comprising semiconductor elements as digital light imaging elements (pixels), and wherein the bitmap mask is created in a plane in which the semiconductor elements are arranged in a mutually spaced fixed manner.

* * * * *